US012647411B2

(12) United States Patent
Dong et al.

(10) Patent No.: US 12,647,411 B2
(45) Date of Patent: Jun. 2, 2026

(54) AUTHENTICATION ORCHESTRATION SYSTEM

(71) Applicant: Snap Inc., Santa Monica, CA (US)

(72) Inventors: Xiangfei Dong, Cupertino, CA (US);
Robert Ellis Lee, Bellevue, WA (US)

(73) Assignee: SNAP INC., Santa Monica, CA (US)

( * ) Notice: Subject to any disclaimer, the term of this patent is extended or adjusted under 35 U.S.C. 154(b) by 187 days.

(21) Appl. No.: 18/224,989

(22) Filed: Jul. 21, 2023

(65) Prior Publication Data

US 2025/0030681 A1     Jan. 23, 2025

(51) Int. Cl.
  *H04L 9/32*       (2006.01)
  *H04L 9/40*       (2022.01)
(52) U.S. Cl.
  CPC ...... *H04L 63/0838* (2013.01); *H04L 63/0861* (2013.01); *H04L 63/105* (2013.01)
(58) Field of Classification Search
  CPC ............. H04L 63/0838; H04L 63/0861; H04L 63/105; H04L 9/3271; H04L 63/0876; G06Q 20/388; G06Q 20/4014; G06Q 20/4016; H04W 12/67; G06F 2221/2103; G06F 21/316
  See application file for complete search history.

(56) References Cited

U.S. PATENT DOCUMENTS

| | | | | |
|---|---|---|---|---|
| 9,485,237 B1 * | 11/2016 | Johansson | ............. | H04L 9/3271 |
| 11,233,788 B1 * | 1/2022 | Hitchcock | ............... | G06F 21/32 |

| | | | | |
|---|---|---|---|---|
| 2011/0225625 A1 * | 9/2011 | Wolfson | ................ | H04L 63/205 |
| | | | | 726/1 |
| 2016/0087957 A1 * | 3/2016 | Shah | ...................... | H04L 63/205 |
| | | | | 726/1 |
| 2016/0335639 A1 * | 11/2016 | Merz | .................. | G06Q 20/4016 |
| 2021/0297422 A1 * | 9/2021 | McDorman | ........... | H04L 63/107 |

(Continued)

FOREIGN PATENT DOCUMENTS

| | | | | |
|---|---|---|---|---|
| CN | 111552942 | | 8/2020 | |
| JP | 2003006161 A | * | 1/2003 | ......... H04L 63/0823 |

OTHER PUBLICATIONS

"International Application Serial No. PCT/US2024/038498, International Search Report mailed Sep. 17, 2024", 4 pgs.

(Continued)

*Primary Examiner* — Trong H Nguyen
(74) *Attorney, Agent, or Firm* — SCHWEGMAN LUNDBERG & WOESSNER, P.A.

(57)     ABSTRACT

Systems, methods, and computer readable media for an authentication orchestration system. Example methods include receiving, from an authentication client, an authentication request, the authentication request comprising an indication of an account and an indication of a goal authentication level. The method further includes accessing a current authentication level and adjusting, based on a risk level, the goal authentication level to an adjusted goal authentication level. The method further includes selecting a challenge method of a plurality of challenge methods based on a difference between the adjusted goal authentication level and the current authentication level. The method further includes performing the selected challenge method with a user associated with the account, and causing to be sent, to the authentication client, an indication of whether the adjusted authentication level was achieved.

20 Claims, 12 Drawing Sheets

(56) References Cited

U.S. PATENT DOCUMENTS

| | | | | |
|---|---|---|---|---|
| 2021/0409405 A1* | 12/2021 | Salajegheh | ......... | H04L 63/0807 |
| 2022/0222371 A1* | 7/2022 | Liu | ......................... | H04L 63/08 |
| 2022/0277070 A1* | 9/2022 | Robert Jose | ........ | H04L 63/0861 |
| 2024/0137342 A1* | 4/2024 | Akkapeddi | ......... | H04L 63/0236 |

OTHER PUBLICATIONS

"International Application Serial No. PCT/US2024/038498, Written Opinion mailed Sep. 17, 2024", 7 pgs.

* cited by examiner

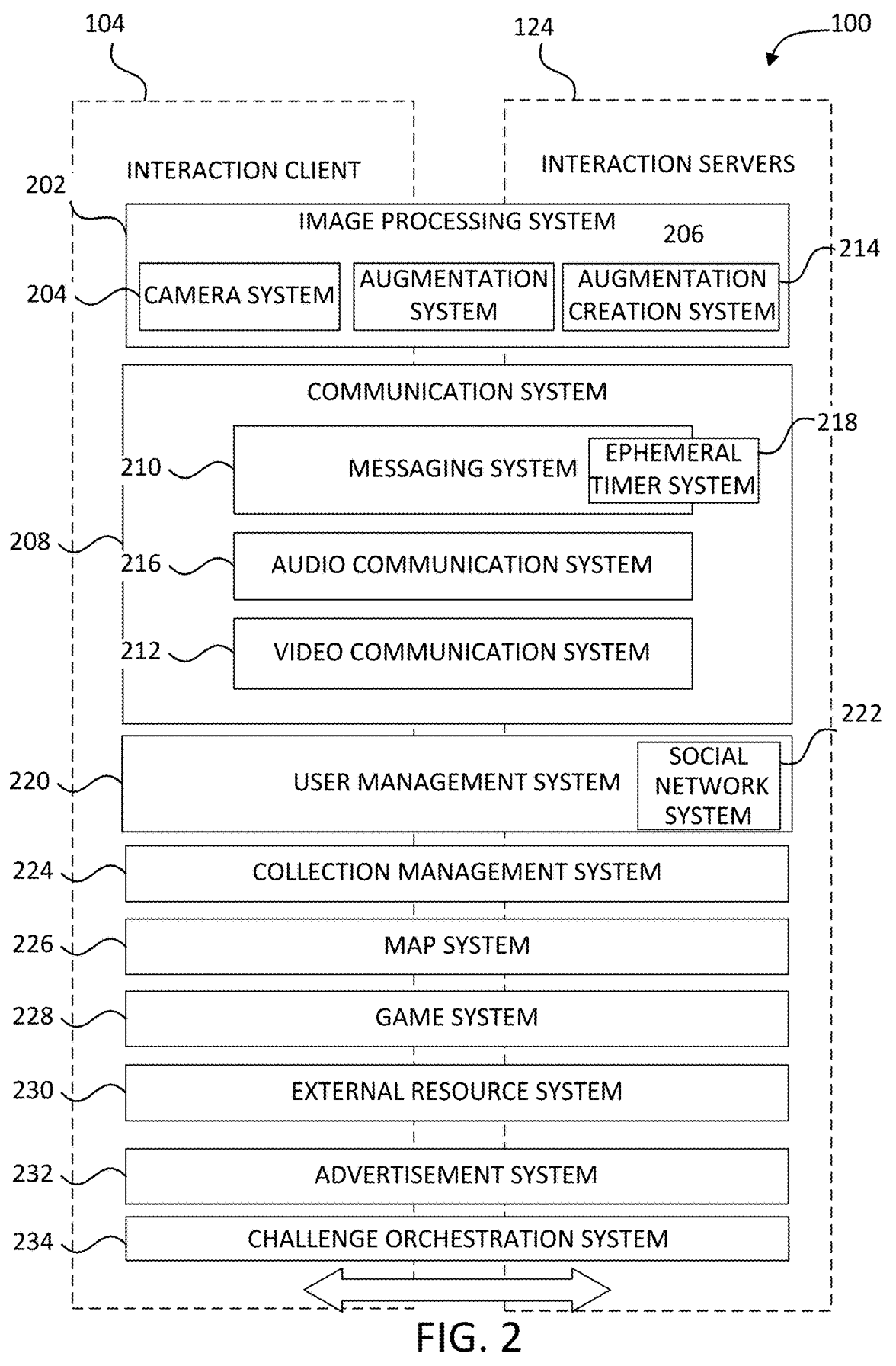

104

124

100

INTERACTION CLIENT

INTERACTION SERVERS

202

IMAGE PROCESSING SYSTEM     206

214

204

CAMERA SYSTEM

AUGMENTATION SYSTEM

AUGMENTATION CREATION SYSTEM

COMMUNICATION SYSTEM

218

210

MESSAGING SYSTEM

EPHEMERAL TIMER SYSTEM

208

216

AUDIO COMMUNICATION SYSTEM

212

VIDEO COMMUNICATION SYSTEM

222

220

USER MANAGEMENT SYSTEM

SOCIAL NETWORK SYSTEM

224

COLLECTION MANAGEMENT SYSTEM

226

MAP SYSTEM

228

GAME SYSTEM

230

EXTERNAL RESOURCE SYSTEM

232

ADVERTISEMENT SYSTEM

234

CHALLENGE ORCHESTRATION SYSTEM

FIG. 2

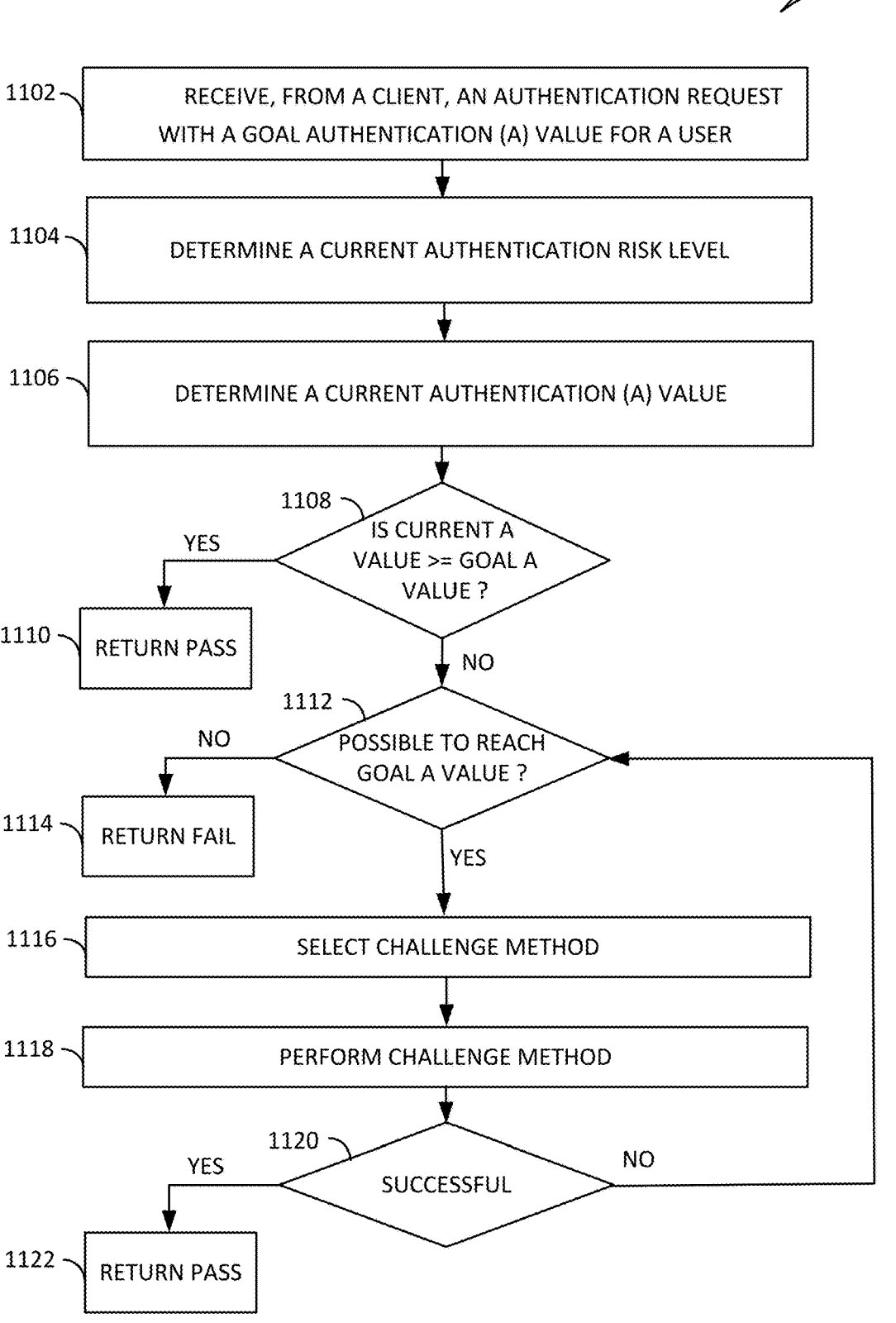

1100

1102 — RECEIVE, FROM A CLIENT, AN AUTHENTICATION REQUEST WITH A GOAL AUTHENTICATION (A) VALUE FOR A USER

1104 — DETERMINE A CURRENT AUTHENTICATION RISK LEVEL

1106 — DETERMINE A CURRENT AUTHENTICATION (A) VALUE

1108 — IS CURRENT A VALUE >= GOAL A VALUE ?

YES

1110 — RETURN PASS

NO

1112 — POSSIBLE TO REACH GOAL A VALUE ?

NO

1114 — RETURN FAIL

YES

1116 — SELECT CHALLENGE METHOD

1118 — PERFORM CHALLENGE METHOD

1120 — SUCCESSFUL

YES

NO

1122 — RETURN PASS

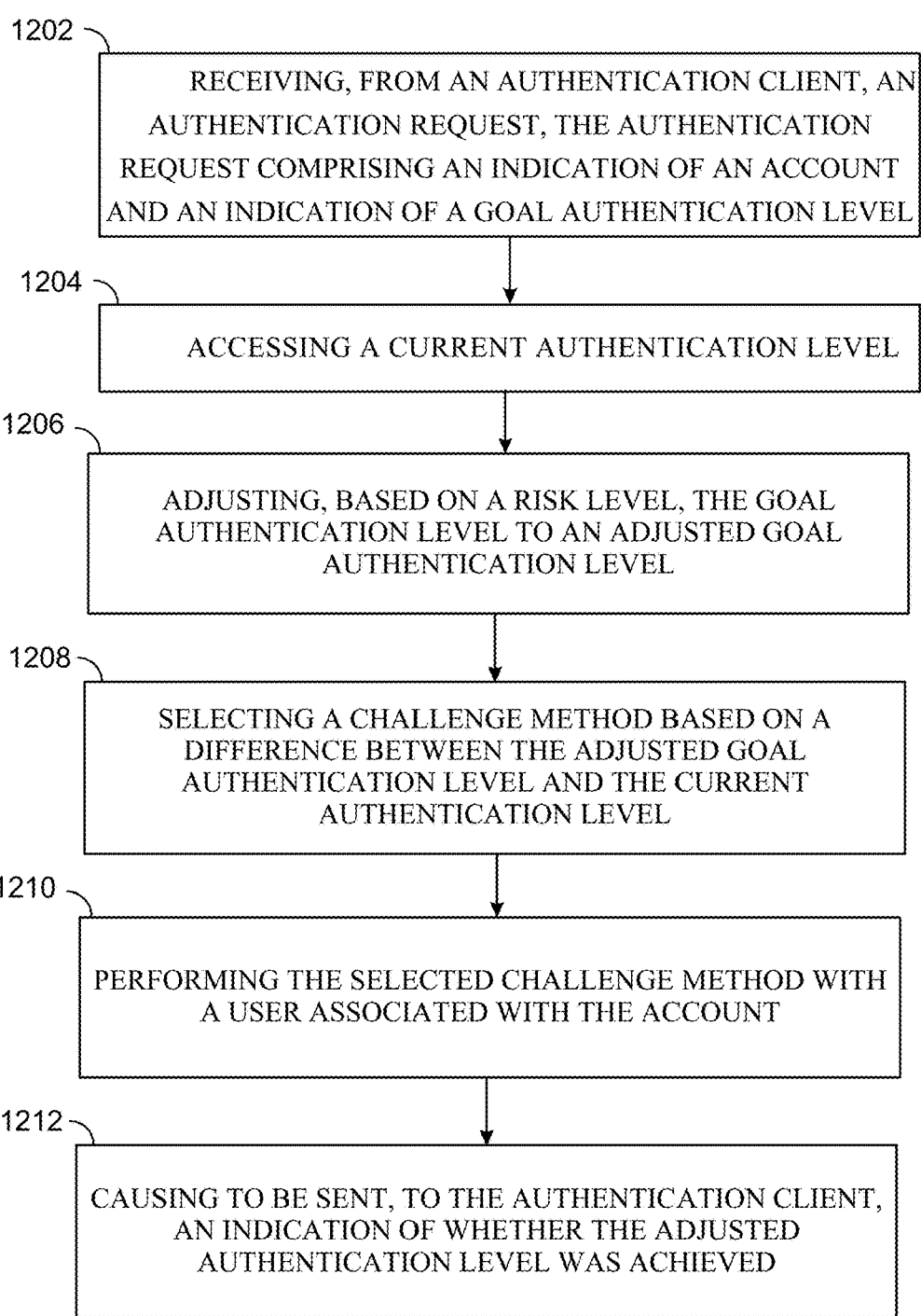

1202

RECEIVING, FROM AN AUTHENTICATION CLIENT, AN AUTHENTICATION REQUEST, THE AUTHENTICATION REQUEST COMPRISING AN INDICATION OF AN ACCOUNT AND AN INDICATION OF A GOAL AUTHENTICATION LEVEL

1204

ACCESSING A CURRENT AUTHENTICATION LEVEL

1206

ADJUSTING, BASED ON A RISK LEVEL, THE GOAL AUTHENTICATION LEVEL TO AN ADJUSTED GOAL AUTHENTICATION LEVEL

1208

SELECTING A CHALLENGE METHOD BASED ON A DIFFERENCE BETWEEN THE ADJUSTED GOAL AUTHENTICATION LEVEL AND THE CURRENT AUTHENTICATION LEVEL

1210

PERFORMING THE SELECTED CHALLENGE METHOD WITH A USER ASSOCIATED WITH THE ACCOUNT

1212

CAUSING TO BE SENT, TO THE AUTHENTICATION CLIENT, AN INDICATION OF WHETHER THE ADJUSTED AUTHENTICATION LEVEL WAS ACHIEVED

FIG. 12

AUTHENTICATION ORCHESTRATION SYSTEM

TECHNICAL FIELD

Examples of the present disclosure relate generally to an authentication orchestration system that performs challenge methods in response to authentication requests. More particularly, but not by way of limitation, examples of the present disclosure relate to an authentication orchestration system that receives a goal authentication level from an authentication client and performs one or more challenge methods to raise an authentication level of an account to the goal authentication level.

BACKGROUND

Users increasingly want more security and security risks continue to multiple with more intelligent bots and artificial intelligence. Moreover, users want convenience and often find challenges to be burdensome.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 2 is a diagrammatic representation of a messaging system, according to some examples, that has both client-side and server-side functionality.

FIG. 11 illustrates a method for authentication challenge orchestration, in accordance with some examples.

FIG. 12 illustrates a method for authentication challenge orchestration, in accordance with some examples.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Often authentication mechanisms are anecdotal and associated with specific applications that perform their own authentication. There may be multiple applications within a system that each have their separate methods for performing authentication. Additionally, often global risk indicators cannot be considered because the applications perform their authentications separately.

Figure 9:
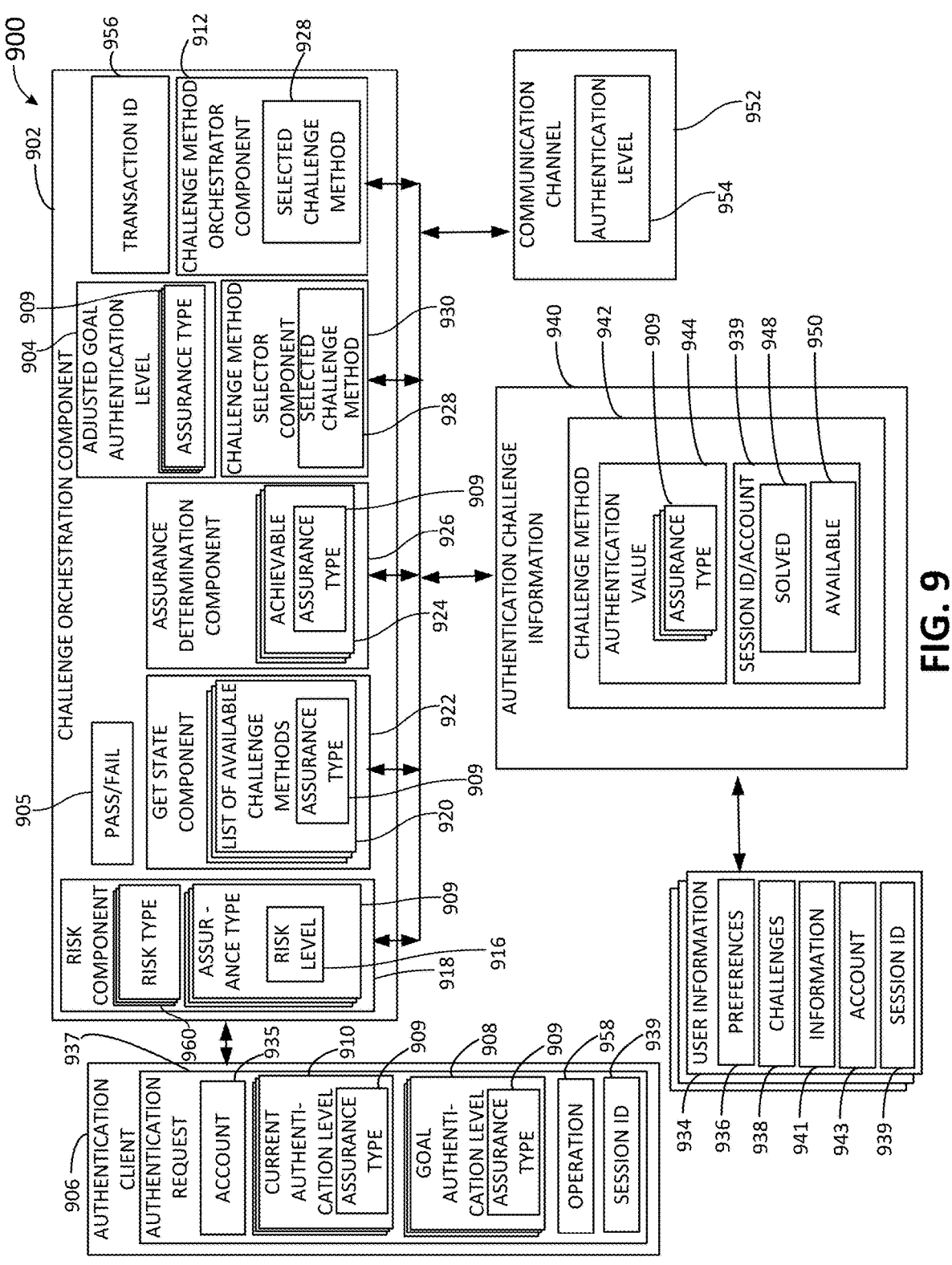
FIG. 9 illustrates a system for an authentication challenge orchestration, in accordance with some examples.

A technical challenge, referring to FIG. 9, is how to authenticate a user 1018 of an account 935 to a goal authentication level 908. The technical challenge is addressed by, referring to FIGS. 9 and 10, an challenge orchestration component 902 that decouples the goal authentication level 908 requested by the authentication client 906 from the challenge methods 942 used to satisfy the goal authentication level 908. The challenge orchestration component 902 determines a risk level 916, which indicates a risk level 916 that may be beyond the risk from the single authentication client 906. For example, there may have been many hacking attempts performed on the interaction server system 110 or over other systems around the internet. The risk level 916 is used to adjust the goal authentication level 908 based on the risk level 916 to generate an adjusted goal authentication level 904. For example, if the goal authentication level 908 is "5", and the risk level 916 is moderate, then the goal authentication level 908 may be raised to "8".

The get state component 922 generates a list of available challenge method 920 available to the authentication client 906 for the account 935. For example, the get state component 922 may determine if a user 1018 is wearing head-wearable apparatus 116 to determine whether an eye scan challenge method 942 is available. The assurance determination component 926 determines whether the adjusted goal authentication level 904 is achievable 924 based on the list of available challenge methods 920.

The challenge method selector component 930 selects one or more challenge methods 942 that will raise the current authentication level 910 to the adjusted goal authentication level 904 based on the list of available challenge methods 920 and the authentication value 944 associated with the challenge methods 942. The challenge method orchestrator component 912 performs the selected challenge method 928.

Figure 1:
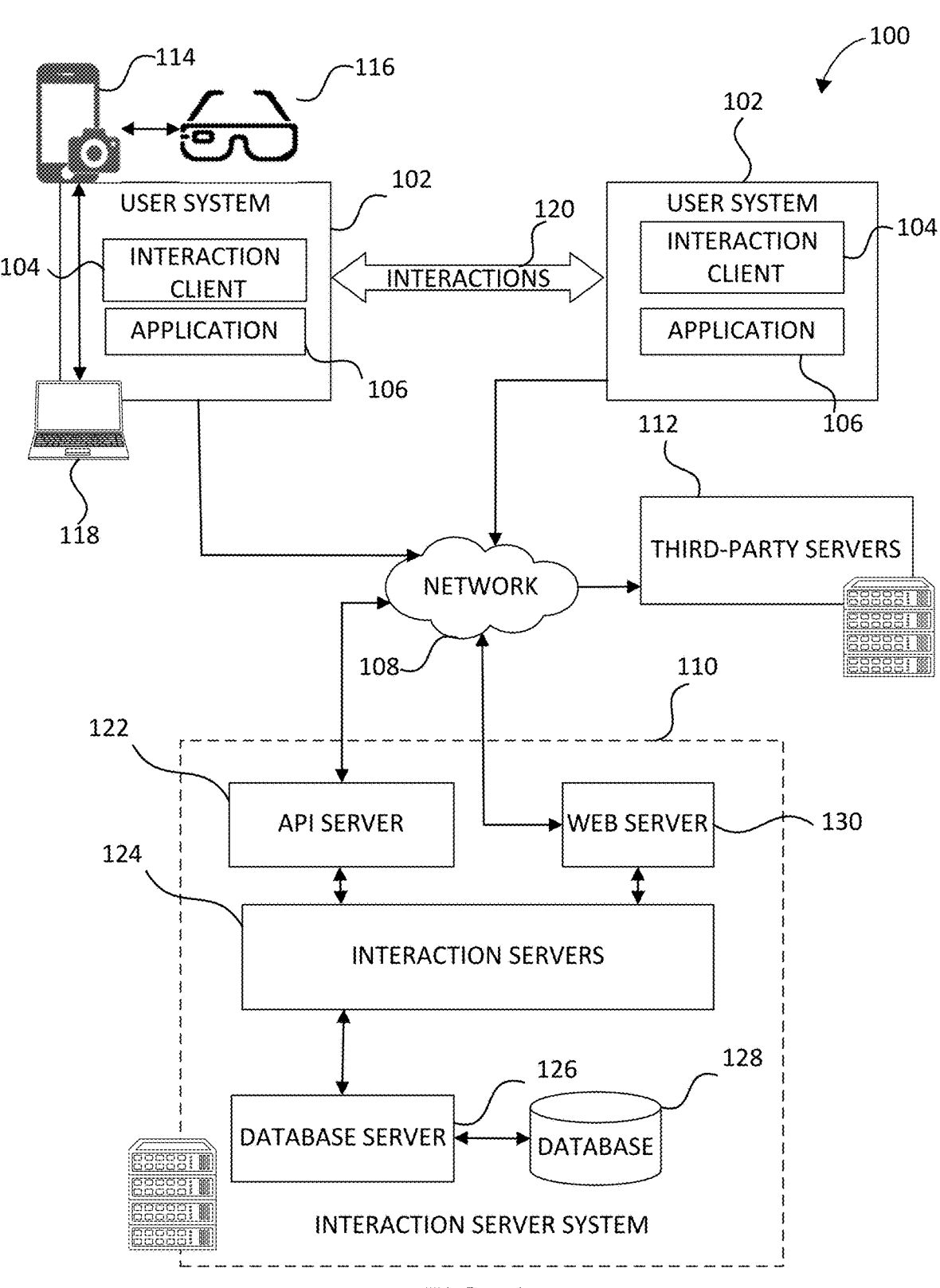
FIG. 1 is a diagrammatic representation of a networked environment in which the present disclosure may be deployed, according to some examples.

The challenge orchestration component 902 enables the authentication client 906 to be decoupled for the challenge methods 942 and enables challenge methods 942 to be added and removed without changes to the authentication client 906. Additionally, the challenge orchestration component 902 enables the goal authentication level 908 to be adjusted based on global security threats and based on previous authentication requests 937. For example, hacking method is to change contact information so that the user 1018 does not receive notifications of changes to account 935. This may be difficult for an authentication client 906 to monitor as the requests may come from different authentication clients 906. Networked Computing Environment FIG. 1 is a block diagram showing an example interaction system 100 for facilitating interactions (e.g., exchanging text messages, conducting text audio and video calls, or playing games) over a network. The interaction system 100 includes multiple client systems, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems), an interaction server system 110 and third-party servers 112). An interaction client 104 can also communicate with locally hosted applications 106 using Applications Program Interfaces (APIs).

Each user system 102 may include multiple user devices, such as a computing device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a *.js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network platform 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system

100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

The authentication orchestration system 234 supports or is the same or similar as system 900. The authentication orchestration system 234 may provide storage and retrieval services for the authentication challenge information 940, the user information 934, and/or the risk information 1020. The authentication orchestration system 234 may perform functions associated with the challenge orchestration component 902. Additionally, the authentication orchestration system 234 may act as an intermediary for performing challenge method 942 by sending data between the computing device 114, the authentication client 906, the head-wearable apparatus 116, user system 102, computing device 118, server 1006, off-site client device 1004, and/or the challenge orchestration component 902. In some examples, the authentication orchestration system 234 performs one or more functions described in conjunction with systems 900 or 1000.

Data Architecture

Figure 3:
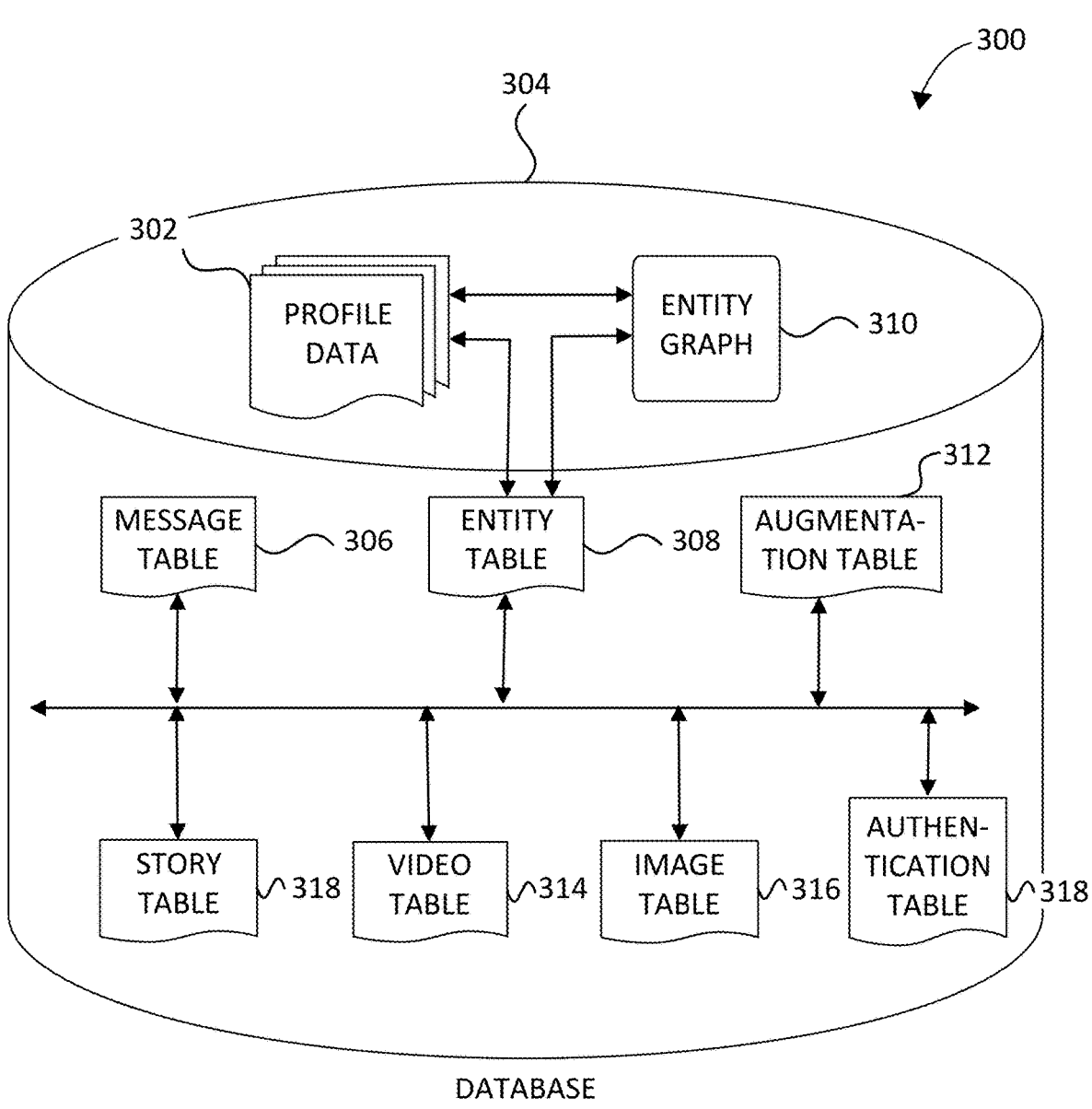
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also includes authentication table 318. The authentication table 318 includes, referring to FIGS. 9 and 10, user information 934, authentication challenge information 940, risk information 1020, and so forth.

Data Communications Architecture

Figure 4:
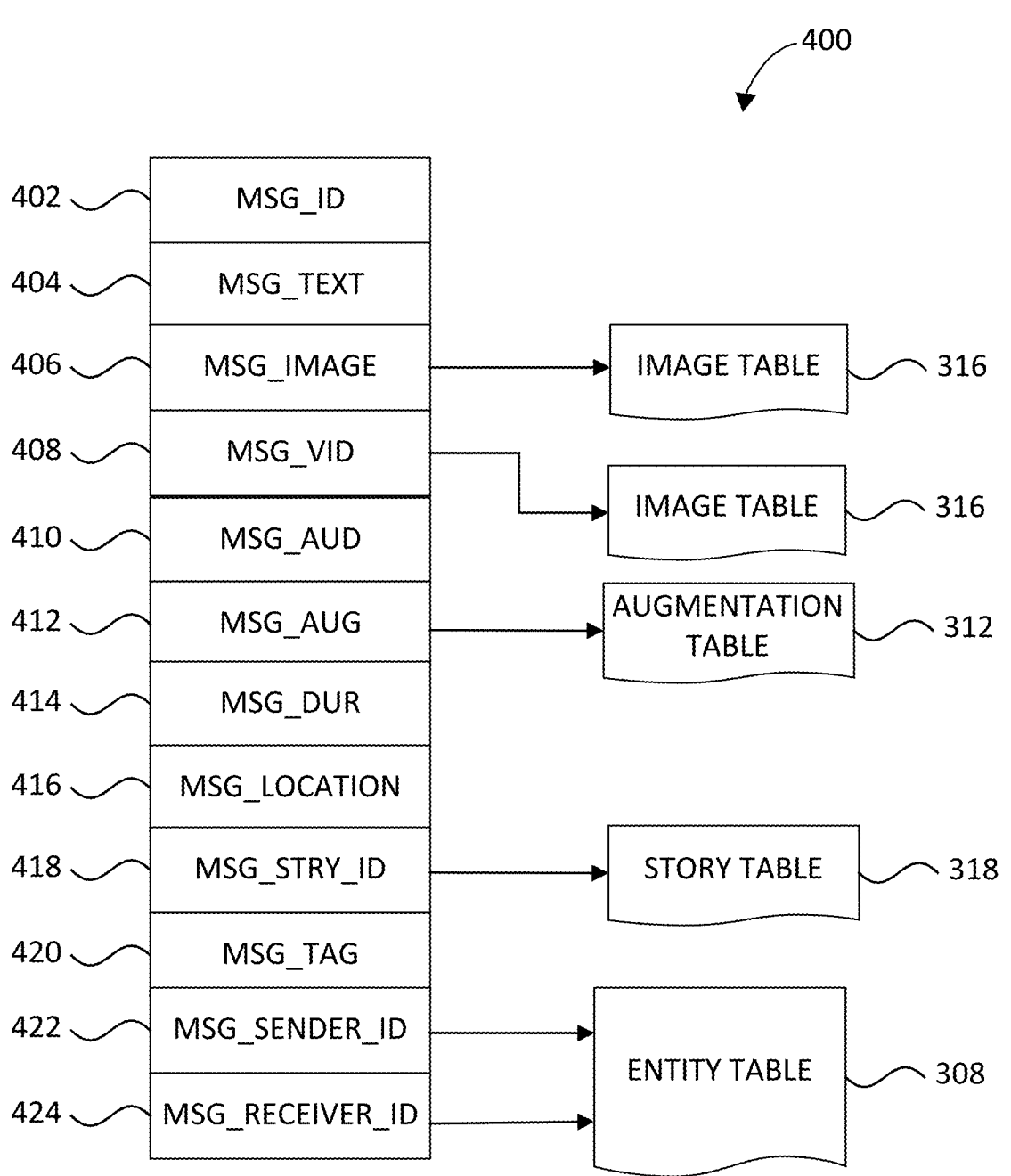
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402 is a unique identifier that identifies the message 400.

Message text payload 404 is text, to be generated by a user via a user interface of the user system 102, and that is included in the message 400.

Message image payload 406 is image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414 is a parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

System With Head-Wearable Apparatus

Figure 5:
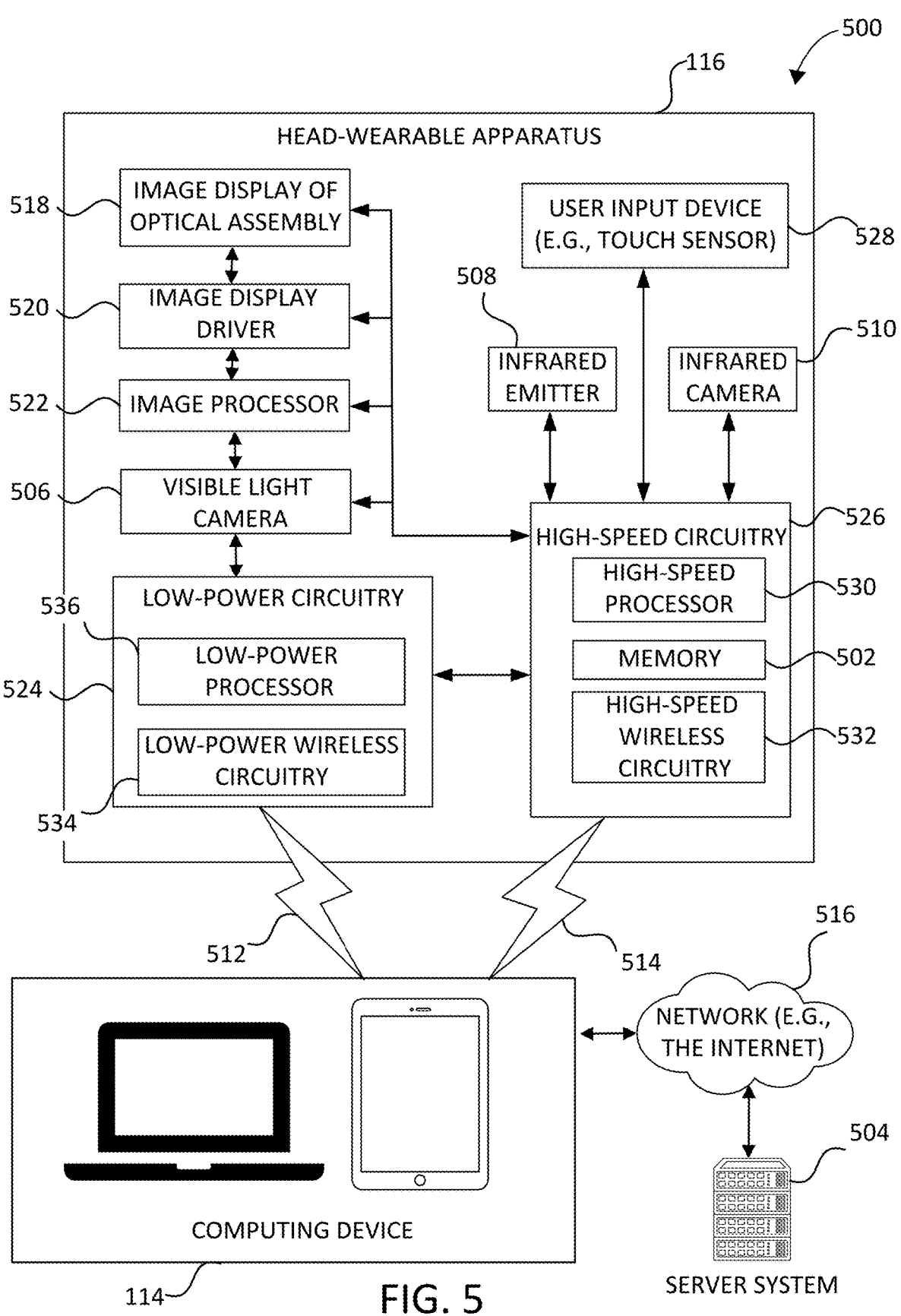
FIG. 5 illustrates a system in which the head-wearable apparatus, according to some examples.

FIG. 5 illustrates a system 500 including a head-wearable apparatus 116 with a selector input device, according to some examples. FIG. 5 is a high-level functional block diagram of an example head-wearable apparatus 116 communicatively coupled to a computing device 114 and various server systems 504 (e.g., the interaction server system 110) via various networks 108.

The head-wearable apparatus 116 includes one or more cameras, each of which may be, for example, a visible light camera 506, an infrared emitter 508, and an infrared camera 510.

The computing device 114 connects with head-wearable apparatus 116 using both a low-power wireless connection 512 and a high-speed wireless connection 514. The computing device 114 is also connected to the server system 504 and the network 516, in accordance with some examples. The computing device 114 may be a portable computing device such as a smart phone, tablet, laptop, or another type of computing device 114 such as a desktop computer, or another type of computing device 114.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless wide, local, or wide area network transceivers (e.g., cellular or WiFi). Computing device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502.

The head-wearable apparatus 116 is connected to a host computer. For example, the head-wearable apparatus 116 is paired with the computing device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the computing device 114 and the head-wearable apparatus 116.

The computing device 114 includes a processor and a network communication interface coupled to the processor. The network communication interface allows for communication over the network 516, low-power wireless connection 512, or high-speed wireless connection 514. Computing device 114 can further store at least portions of the instructions for generating binaural audio content in the computing device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the computing device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the computing device 114 via the low-power wireless circuitry 534 or high-speed wireless circuitry 532.

Machine Architecture

Figure 6:
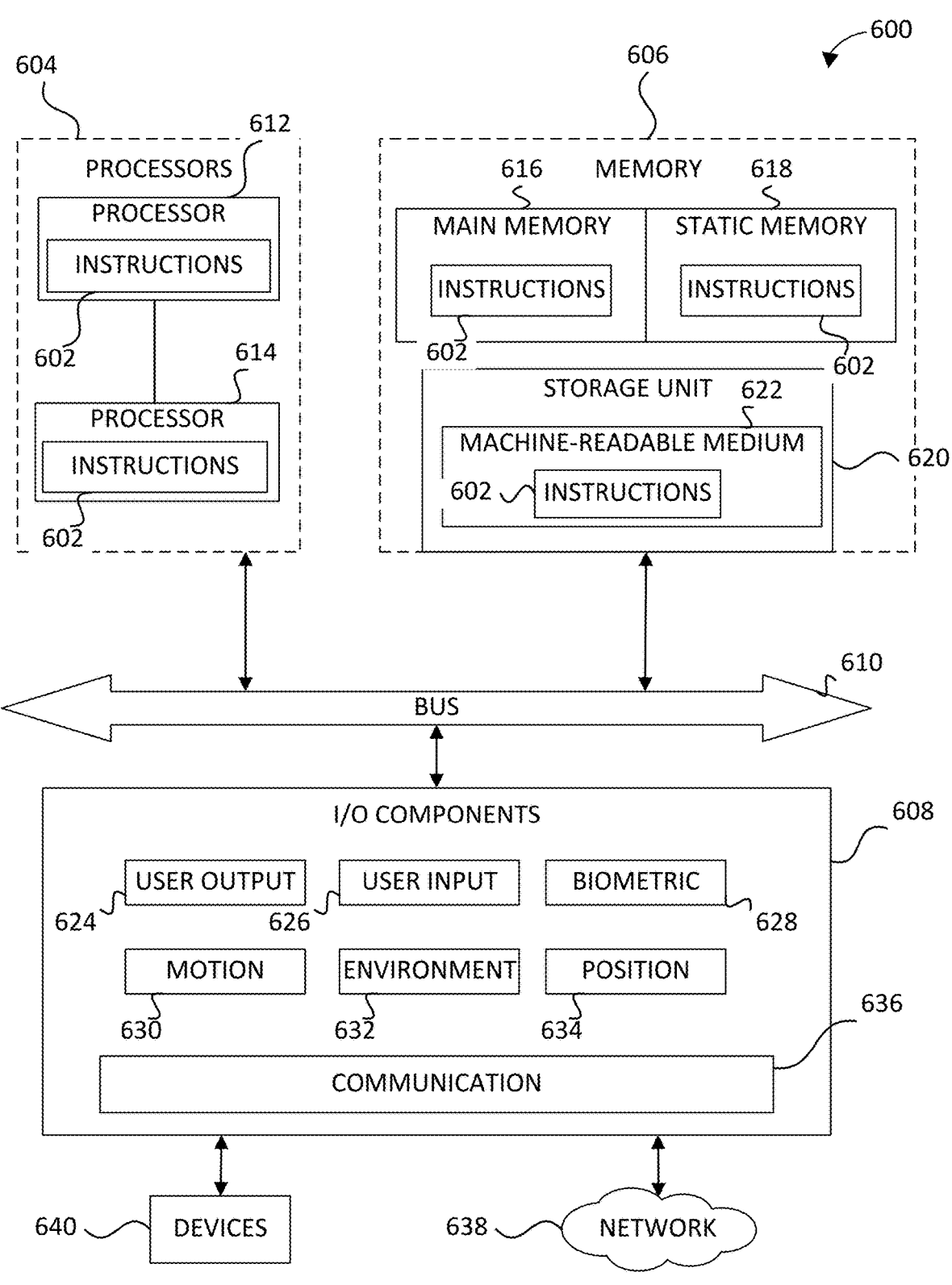
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise the user system 102 or any one of multiple server devices forming part of the interaction server system 110. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
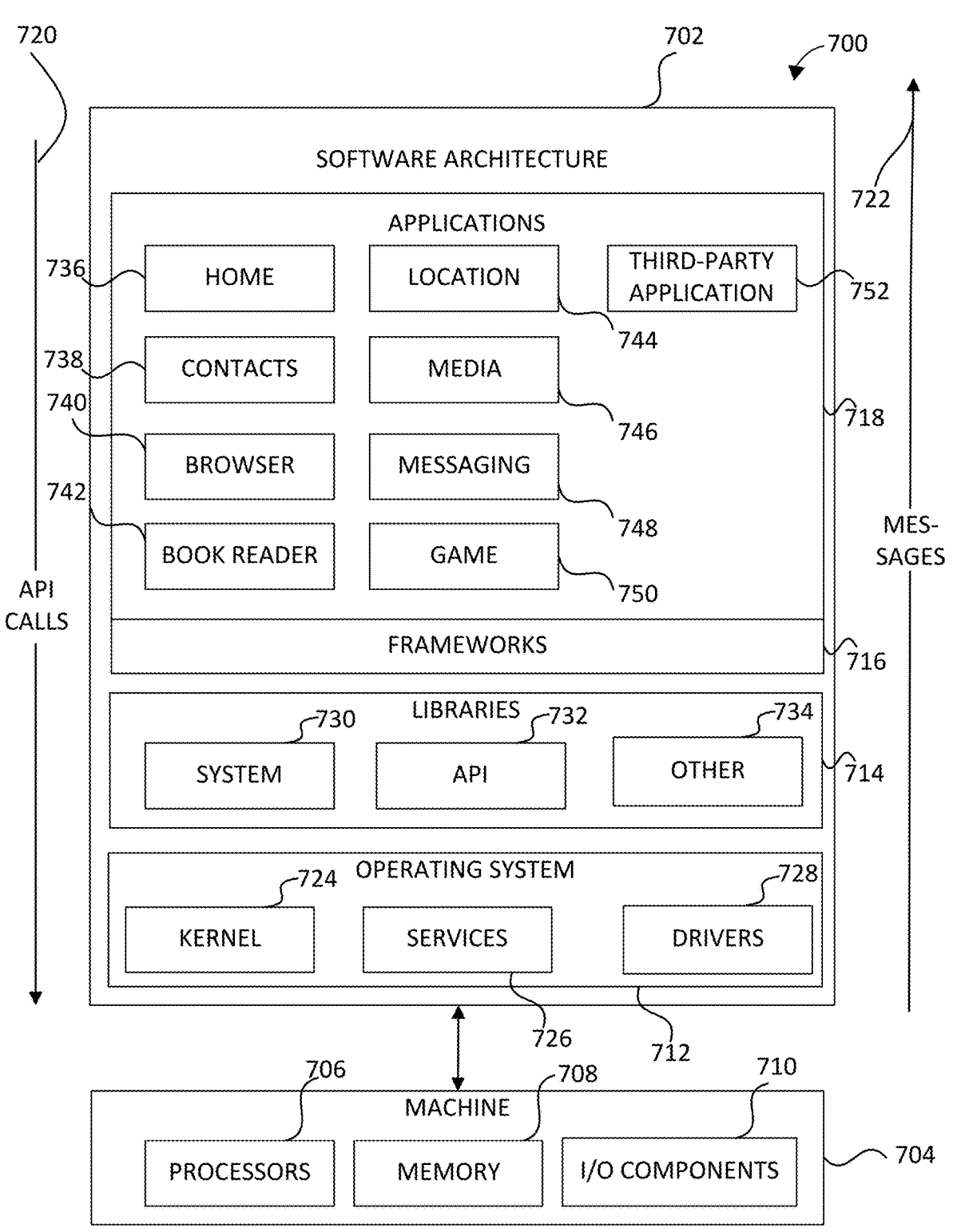
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a book reader application 742, a location application 744, a media application 746, a messaging application 748, a game application 750, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 752 can invoke the API calls 720 provided by the operating system 712 to facilitate functionalities described herein.

Figure 8:
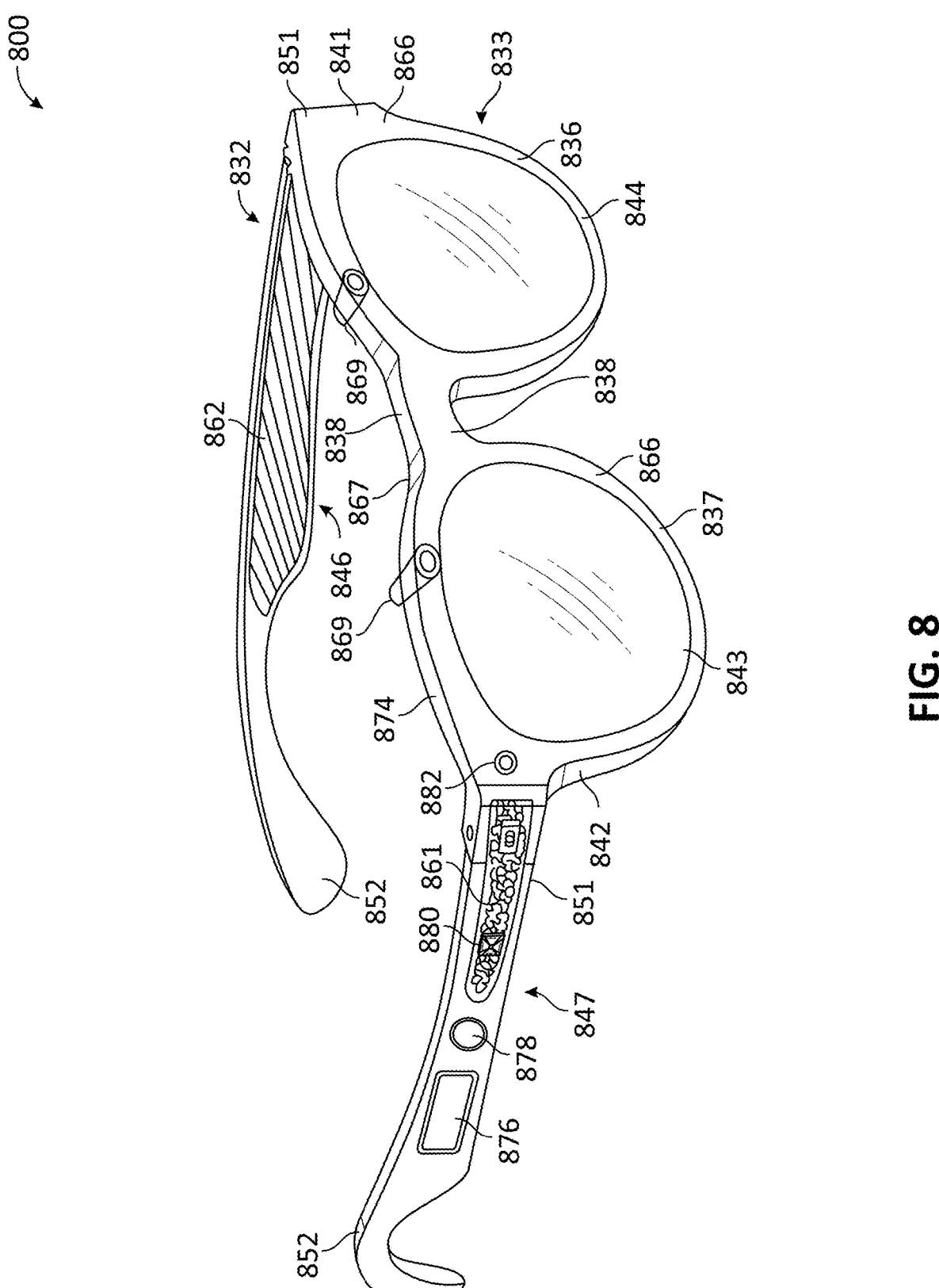
FIG. 8 is a perspective view of a head-wearable apparatus in the form of glasses, in accordance with some examples.

FIG. 8 is a perspective view of a head-wearable apparatus in the form of glasses 800, in accordance with some examples. The glasses 800 are an article of eyewear including electronics, which operate within a network system for communicating image and video content. FIG. 8 illustrates an example of the head-wearable apparatus 116. In some examples, the wearable electronic device is termed augmented reality (AR), mixed reality (MR), virtual reality (VR) glasses. The glasses 800 can include a frame 832 made from any suitable material such as plastic or metal, including any suitable shape memory alloy. The frame 832 can have a front piece 833 that can include a first or left lens, display, or optical element holder 836 and a second or right lens, display, or optical element holder 837 connected by a bridge 838. The front piece 833 additionally includes a left end portion 841 and a right end portion 842. A first or left optical element 844 and a second or right optical element 843 can be provided within respective left and right optical element holders 836, 837. Each of the optical elements 843, 844 can be a lens, a display, a display assembly, or a combination of the foregoing. In some examples, for example, the glasses 800 are provided with an integrated near-eye display mechanism that enables, for example, display to the user of preview images for visual media captured by cameras 869 of the glasses 800.

The frame 832 additionally includes a left arm or temple piece 846 and a right arm or temple piece 847 coupled to the respective left and right end portions 841, 842 of the front piece 833 by any suitable means such as a hinge (not shown), so as to be coupled to the front piece 833, or rigidly or fixedly secured to the front piece 833 so as to be integral with the front piece 833. Each of the temple pieces 846 and 847 can include a first portion 851 that is coupled to the respective end portion 841 or 842 of the front piece 833 and any suitable second portion 852, such as a curved or arcuate piece, for coupling to the ear of the user. In one example, the front piece 833 can be formed from a single piece of material, so as to have a unitary or integral construction. In one example, the entire frame 832 can be formed from a single piece of material so as to have a unitary or integral construction.

The glasses 800 include a computing device, such as a computer 861, which can be of any suitable type so as to be carried by the frame 832 and, in one example, of a suitable size and shape, so as to be at least partially disposed in one or more of the temple pieces 846 and 847. In one example, the computer 861 has a size and shape similar to the size and shape of one of the temple pieces 846, 847 and is thus disposed almost entirely if not entirely within the structure and confines of such temple pieces 846 and 847.

In one example, the computer 861 can be disposed in both of the temple pieces 846, 847. The computer 861 can include one or more processors with memory, wireless communication circuitry, and a power source. The computer 861 comprises low-power circuitry, high-speed circuitry, location circuitry, and a display processor. Various other examples may include these elements in different configurations or integrated together in different ways. Additional details of aspects of the computer 861 may be implemented as described with reference to the description that follows.

The computer 861 additionally includes a battery 862 or other suitable portable power supply. In one example, the battery 862 is disposed in one of the temple pieces 846 or 847. In the glasses 800 shown in FIG. 8, the battery 862 is shown as being disposed in the left temple piece 846 and electrically coupled using a connection 874 to the remainder of the computer 861 disposed in the right temple piece 847. One or more input and output devices can include a connector or port (not shown) suitable for charging a battery 862 accessible from the outside of the frame 832, a wireless receiver, transmitter, or transceiver (not shown), or a combination of such devices.

The glasses 800 include digital cameras 869. Although two cameras 869 are depicted, other examples contemplate the use of a single or additional (i.e., more than two) cameras 869. For ease of description, various features relating to the cameras 869 will be described further with reference to only a single camera 869, but it will be appreciated that these features can apply, in suitable examples, to both cameras 869.

In various examples, the glasses 800 may include any number of input sensors or peripheral devices in addition to the cameras 869. The front piece 833 is provided with an outward-facing, forward-facing, front, or outer surface 866 that faces forward or away from the user when the glasses 800 are mounted on the face of the user, and an opposite inward-facing, rearward-facing, rear, or inner surface 867 that faces the face of the user when the glasses 800 are mounted on the face of the user. Such sensors can include inward-facing video sensors or digital imaging components such as cameras 869 that can be mounted on or provided within the inner surface 867 of the front piece 833 or elsewhere on the frame 832 so as to be facing the user, and outward-facing video sensors or digital imaging components such as the cameras 869 that can be mounted on or provided with the outer surface 866 of the front piece 833 or elsewhere on the frame 832 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 843, 844 (or lenses) to provide a mixed reality or augmented reality experience for the user of the glasses 800.

The glasses 800 further include an example of a camera control mechanism or user input mechanism comprising a camera control button mounted on the frame 832 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 832 adjacent to its surface for detecting the presence of a user's finger, to dispose the touch-sensitive button to the engaged condition when the user touches a finger to the corresponding spot on the outer surface 866 of the frame 832. It will be appreciated that the above-described camera control button and capacitive touch button are but two examples of a haptic input mechanism for single-action control of the camera

869, and that other examples may employ different single-action haptic control arrangements.

The computer 861 is configured to perform the methods described herein. In some examples, the computer 861 is coupled to one or more antennas for reception of signals from a GNSS and circuitry for processing the signals where the antennas and circuitry are housed in the glasses 800. In some examples, the computer 861 is coupled to one or more wireless antennas and circuitry for transmitting and receiving wireless signals where the antennas and circuitry are housed in the glasses 800. In some examples, there are multiple sets of antennas and circuitry housed in the glasses 800. In some examples, the antennas and circuitry are configured to operate in accordance with a communication protocol such as Bluetooth™, Low-energy Bluetooth™, IEEE 802, IEEE 802.11az/be, WiFI®, and so forth. In some examples, PDR sensors housed in glasses 800 and coupled to the computer 861. In some examples, the glasses 800 are VR headsets where optical elements 843, 844 are opaque screens for displaying images to a user of the VR headset. In some examples, the computer 861 is coupled to user interface elements such as slide or touchpad 876 and button 878. A long press of button 878 resets the glasses 800. The slide or touchpad 876 and button 878 are used for a user to provide input to the computer 861 and/or other electronic components of the glasses 800. The glasses 800 include one or more microphones 882 that are coupled to the computer 861. The glasses 800 include one or more gyroscopes 880.

Authentication Orchestration System

FIG. 9 illustrates a system 900 for authentication challenge orchestration, in accordance with some examples. The system 900 includes authentication client 906, challenge orchestration component 902, authentication challenge information 940, and user information 934.

The authentication client 906 sends to the challenge orchestration component 902 an authentication request 937, which includes one or more of the following: an account 935, a session identification (ID) 939, a goal authentication level 908, operation 958, and a current authentication level 910. In some examples, the challenge orchestration component 902 accesses the data included in the authentication request 937 via a data structure of active applications and/or a data structure of accounts 935 and/or session IDs 939.

The authentication client 906 is an application that would like a higher level of authentication with the goal authentication level 910 for the account 935 and/or session ID 939, in accordance with some examples. In some examples, the authentication client 906 needs to ensure that challenge orchestration component 902 approves the operation 958 prior to performing the operation 958 for the account 935 associated with the session ID 939.

For example, a user or application associated with the user information 934 of the account 935 and/or session ID 939 wants to change a password of the account 935. The authentication client 906 calls the challenge orchestration component 902 to ensure the goal authentication level 908 is met. The goal authentication level 910 indicates an authentication level that would allow the session ID 939 associated with the user information 934 to change the password of the account 935. In some examples, the current authentication level 910 and goal authentication level 908 indicate an assurance type 909 and/or risk type. In some examples, each of the goal authentication levels 908 for each of the assurance types 909 needs to be reached for a pass to be returned in the pass/fail 905 from the challenge orchestration component 902.

For example, if the authentication client 906 is determining whether a "log-in" operation 958 can be performed for a session ID 939, then at least a goal authentication level 908 for an assurance type of an identify assurance level and a goal authentication level 908 of an assurance type 909 of an authentication assurance level would have to be obtained before the operation 958 of "log in" could be performed for the session ID 939 and account 935. In some examples, the challenge orchestration component 902 determines the goal authentication level 908 based on one or more of the operation 958, session ID 939, and the account 935.

The assurance type 909 can be an identify assurance level, which indicates a certainty that the user 1018 associated with the account 935 is who the user 1018 says they are, an authentication assurance level, which is an indication of a level of certainty that the user 1018 is an authorized user 1018 of the account 935, an indication of a level of certainty that a run-time environment the user is using has not been tampered with, a level of certainty that the user is not a "bot" or an automated application, or another assurance type 909. In some examples, the assurance type 909 is not included in the authentication request 937.

The goal authentication level 910 and/or the current authentication level 910 can be a number, a functional description, or another indication of the goal authentication level 910 and/or the current authentication level 910, respectively. Example functional descriptions include change password authentication level, change contact information authentication level, change default authentication methods authentication level, change credit card authentication level, and so forth. In some examples, the goal authentication level 910 and/or the current authentication level 910 are termed one or more of the following: an authentication assurance level (AAL), an enforced authentication assurance level (EAAL), a baseline authentication assurance requirement (BAAR), a baseline identity assurance requirement (BIAR) and so forth. The goal authentication level 08 may be determined by the challenge orchestration component 902 based on an indication of an operation 958 the authentication client 906 intends to perform. In some examples, assurance type 909 for the goal authentication level 910 and/or the current authentication level 910 indicates a risk type.

The account 935 indicates an account on the system associated with the authentication client 906 such as the social network platform 222. The session ID 939 indicates an authenticated session identification session such as a session of the social network platform 222, which may be used to identify the account 935. The session ID 939 and/or the account 935 can be used to determine the user information 934. For example, the account 943 and/or session ID 939 may be used to search a database or stored information regarding authenticated sessions or accounts, in accordance with some examples. In some embodiments, a transaction ID 956 is generated by the challenge orchestration component 902 that is associated with the authentication request 937.

The challenge orchestration component 902 receives the request from the authentication client 906 and attempts to raise the current authentication level 910 to the goal authentication level 910 by applying challenges methods 942. The challenge orchestration component 902 then returns a pass/fail 905 indicating whether the goal authentication level 910 was obtained for the account 935. In some examples, the pass/fail 905 includes an indication of a new current authentication level 910 for the account 935 and/or session ID 939. If the challenge orchestration component 902 returns a fail to the authentication client 906, then the authentication client 906 can attempt to or request that the challenge orchestration component 902 make additional challenge methods 942 available. For example, an additional communication channel 952 may be opened between the user associated with the session ID 939 and challenge orchestration component 902.

The challenge orchestration component 902 receives the request from the authentication client 906 and attempts to raise the current authentication level 910 for each assurance type 909 to the goal authentication level 910 for the corresponding assurance type 909 by applying challenges methods 942. The challenge orchestration component 902 then returns a pass/fail 905 indicating whether the goal authentication level 910 was obtained for the account 935. In some examples, the pass/fail 905 includes an indication of a new current authentication level 910 for the account 935 and/or session ID 939. If the challenge orchestration component 902 returns a fail to the authentication client 906, then the authentication client 906 can attempt to or request that the challenge orchestration component 902 make additional challenge methods 942 available. For example, an additional communication channel 952 may be opened between the user associated with the session ID 939 and the challenge orchestration component 902.

Figure 10:
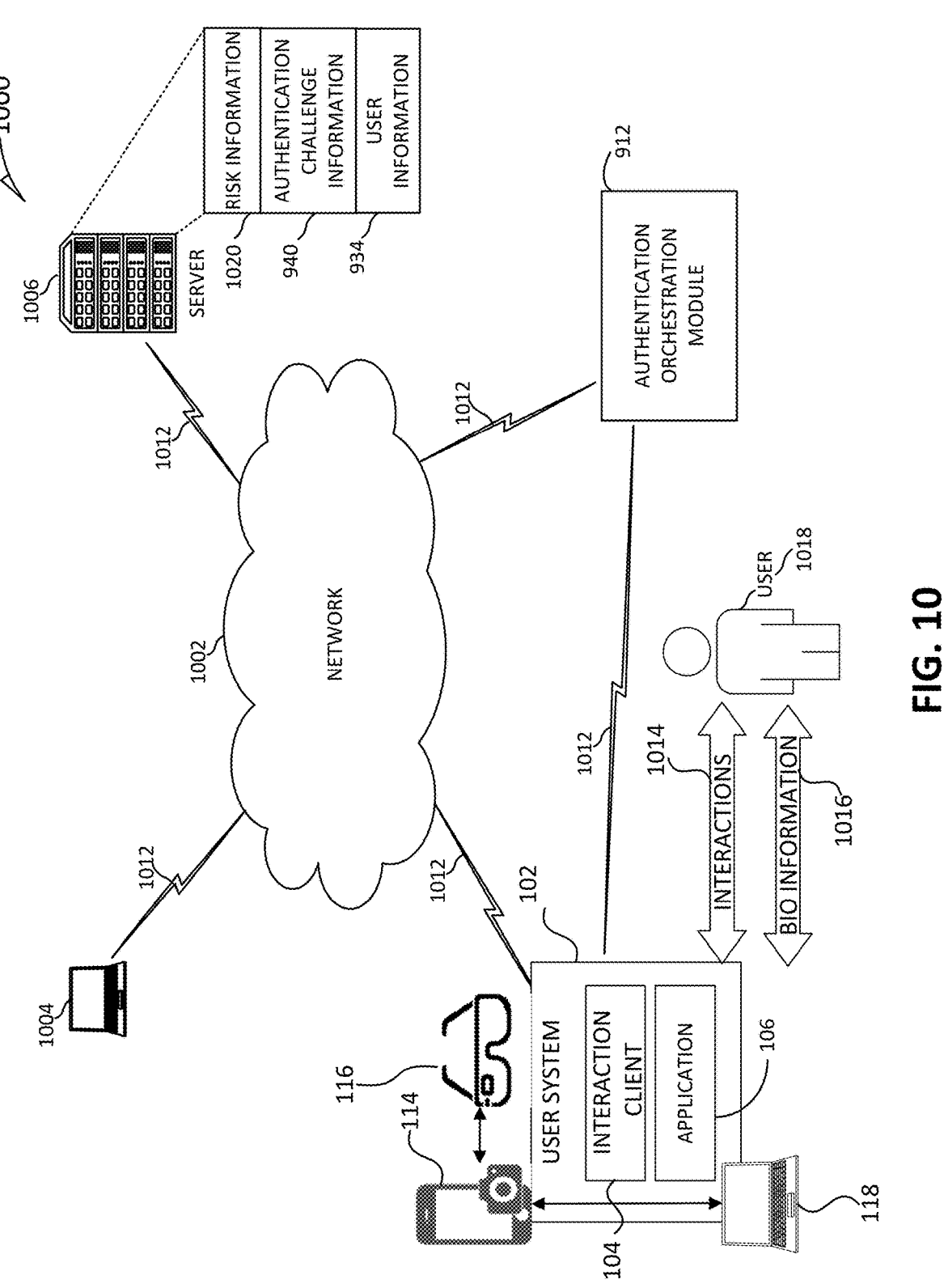
FIG. 10 illustrates a system for an authentication challenge orchestration, in accordance with some examples.

The risk component 918 accesses information such as the authentication challenge information 940 and the risk information 1020 of FIG. 10. The risk component 918 determines a risk level 916 for each assurance type 909, which is based on one or more of: risks associated with the particular account 935, risks associated with a particular session ID 939, the risks associated with the corresponding assurance type 909, the operation 958 to be performed by the authentication client 906, the risks associated with the current system, e.g., there could be a current attack on the system from hackers, risk types 960 associated with the assurance type 909, risks associated with other systems or the internet as a whole, e.g., there may be a higher than normal number of attacks on other systems, and so forth. For example, the risk component 918 may determine that there have been unsuccessful attempts greater than a threshold to access the account 935, so the risk component 918 raises the risk level 916 for the assurance type 909 of identity assurance and the assurance type 909 of authentication assurance.

Example risk types 960 include account takeover (ATO) risk, bad actor account (BAA) risk, tampered run-time environment risk (TRE), non-human actor or automation risk (AR), and so forth. The risk type 960 is associated with one or more assurance types 909 that address the risk indicated by the risk type 960.

For example, if the authentication client 906 indicates a goal authentication level 908 for an operation to be performed of a "sign-in" or indicates an assurance type 909 of "authentication", then the risk component 918 determines which risk types 960 are applicable to the authentication request 937. The risk component 918 determines based on the risk level 916 an adjusted goal authentication level 904 for each corresponding applicable assurance type 909. The challenge orchestration component 902 sets the adjusted goal authentication level 904 based on the current authentication level 910 and the risk level 916 for the corresponding assurance type 909. In some examples, the challenge orchestration component 902 determines the adjusted goal authentication level 904 further based on a minimum authentication level for the operation 958 indicated by the authentication request 937 such as "sign-in".

The risk types 960 may have associated risk levels (not illustrated). In some examples, if the risk component 918 determines the risk level for the risk type 960 of ATO risk, is no greater than normal or nearly zero, then the risk level 916 for the assurance types 909 associated with the ATO risk are not adjusted either higher or lower. If the risk component

918 determines the risk level for the risk type 960 of ATO risk is greater than normal, then the challenge orchestration component 902 adjusts the risk level 916 for assurance types 909 associated with the risk type 960 of ATO risk to a higher value. For example, the risk component 918 sets the risk level 916 of for the assurance type 909 of authentication to be higher. If the risk component 918 determines the risk level 916 for the risk type 960 of ATO risk is critical, then the risk component 918 sets the risk level 916 for assurance types 909 associated with the risk type 960 of ATO to an unattainable high value. The challenge orchestration component 902 or the risk component 918 sets the adjusted goal authentication level 904 for the assurance types 909 based on the corresponding risk level 916.

The risk component 918 may determine the risk type 960 of ATO risk based on multiple authentication requests 937. For example, if a first authentication request 937 indicates an email change, then a second authentication request 937 that indicates a telephone number change for the same account 935, may have a higher ATO and cause the risk level 916 for assurance types 909 associated with the risk type 960 of ATO risk to be raised because of the previous change to the email. The risk component 918 may gather information from the internet to determine the risk level 916 for an assurance type 909. For example, a risk type 960 may be that the federal government of the United States of America may issue a terrorist threat warning level that indicates that hackers from foreign countries are attempting to hack systems. The risk component 918 adjusts the risk level 916 for all applicable assurance types 909 based on all the risk type 960 of the terrorist treat.

The challenge orchestration component 902 or risk component 918 adjusts the goal authentication level 910 based on the risk level 916 to determine an adjusted goal authentication level 904 for each assurance type 909. In some examples, the risk level 916 may have values such as "low", "medium", "high", and "critical". The challenge orchestration component 902 adjusts the goal authentication level 910 by multiplying a value assigned to the risk level 916 for a corresponding assurance type 909, in accordance with some embodiments. For example, if goal authentication level 910 is 15 and the risk level 916 is "low", then the goal authentication level 910 remains the same. If the risk level 916 is "medium", then the goal authentication level 910 is raised by 25% or another percentage. If the risk level 916 is "high", then the goal authentication level 910 is raised by 50% or another percentage. And, if the risk level 916 is "critical", then the goal authentication level 910 is raised by 100% or to an unattainable value. In some examples, the risk level 916 indicates that the challenge orchestration component 902 should not increase the current authentication level 910.

The get state component 922 determines the list of available challenge methods 920 available to use for the account 935 or session ID 939 based on one or more of the following: the authentication challenge information 940, the goal authentication level 910, the adjusted goal authentication level 904, the current authentication level 910, the user information 934, and so forth. The list of available challenge methods 920 may include challenge methods from Tables such as Table 1, Table 2, or Table 3.

Table 1 illustrates challenge methods such as challenge method 942 and an authentication value such as authentication value 944 that is achieved when the challenge method 942 is performed and passed by the user information 934 of the account 935. The authentication value 944 may be based on the assurance type 909.

In some examples, the challenge orchestration component 902 will add the authentication values 944 for an assurance type 909 to determine the current authentication level 910 for an assurance type 909 of the account 935 or session ID 939. For example, if the account 935 has entered a valid password or shared secret and entered a code sent by a short message service (SMS) to a smart phone associated with the account 935, then the current authentication level 910 is "5"+"15" or "20", which may be for an assurance type 909 of authentication and an assurance type of identify. The "authentication value for assurance type 1" through "authentication value for assurance type N" indicates a value for the challenge method 942 for the corresponding assurance type 909. The "convenience to user" indicates how convenient the challenge method 942 is to a user 1018 associated with the account 935. The value of "convenience to user" may be based on a base value associated with the challenge method 942 and then adjusted based on user information 934. For example, the challenge method selector component 930 increases or decreases the value of the "convenience to user" based on how many times the user 1018 has successfully completed the challenge method 942 compared with how many times the user 1018 has failed the challenge method 942.

Additionally, the user information 934 may include such information such as whether the user 1018 is wearing the head-wearable apparatus 116, in which case the "convenience to user" may be increased for the biometric challenge method 942 where the biometric challenge method 942 may capture an image of a face of the user 1018 using a camera of the head-wearable apparatus 116 and compare the image with known images of the face of the user 1018 or use the image as input to a trained neural network. The communication channel 952 indicates available communication channels 952, which may be used to perform a challenge method 942. In some examples, communication channel 952 are associated with an authentication level 954. For example, a communication channel 952 that access a life video of the person associated with session ID 939 would have a higher authentication level 954 than a communication channel 952 of an email account on a different system than the system associated with the session ID 939.

The available to user such as available 950 indicates whether the challenge method 942 is available to a user 1018 identified by session ID 939 or account 935. The solved 948 indicates whether the challenge method 942 has been solved by the session ID 939 and/or account 935.

Table 2, Authentication Challenge Bank, provides challenge methods 942 specifically to address the assurance type 909 of authentication. In some examples, the challenge methods 942 of Table 2 are used for other assurance types 909. Table 3, Identity Challenge Bank, provides challenge methods 942 specifically to address the assurance type 909 of identity. In some examples, the challenge methods of Table 3 are used for other assurance types 909.

The assurance determination component 926 determines whether the goal authentication level 910 for each assurance type 909 is achievable 924. For example, if the adjusted goal authentication level 904 is "30" and the current authentication level 910 is "10", then an authentication value 944 of "20" is needed to reach the goal authentication level 910.

If the assurance determination component 926 determines there are challenge methods 942 available 950 that have not been solved 948 by the user information 934 or account 935 associated with the session ID 939, then the assurance determination component 926 sets achievable 924 to indicate "yes." The challenge method selector component 930 ensures that the user information 934 could perform the challenge method 942. For example, for the SMS, the challenge method selector component 930 ensures that the account 935 or session ID 939 has an available communication channel 952 of email. Additionally, the challenge method selector component 930 evaluates how secure the challenge method 942 is based on a context of the user information 934 of the account 935. For example, if information 941 associated with the user information 934 of the account 935 indicates that the user information 934 is at a home location, then the challenge method selector component 930 may be more likely to select a direct telephone call to the home location. Additionally, the challenge method selector component 930 may determine that one or more challenge methods 942 are inappropriate based on the information 941 associated with the user information 934 of the account 935 associated with the session ID 939. For example, if the user information 934 is in a different country with an insecure SMS system, then the challenge method selector component 930 will not select the SMS challenge method 942.

| Challenge Method | Communication Channel | Authentication Value for Assurance type 1 | Authentication Value for Assurance type N | Available to User | Solved by User | Convenience to User |
|---|---|---|---|---|---|---|
| Password | In-Band | 5 | 3 | Y | Y | 5 |
| OTP | Email | 7 | 5 | Y | N | 3 |
| Voice confirmation | Voice telephone call | 10 | 4 | Y | N | 2 |
| OTP | SMS | 15 | 7 | Y | N | 3 |
| Fingerprint recognition | Biometric | 30 | 5 | Y | N | 1 |
| Face Recognition | Face recognition from head-wearable apparatus 116 | 30 | 5 | Y | N | 6 |

TABLE 2

| | | |
|---|---|---|
| | Authentication Challenge Bank | |
| Challenge Method | Communication Channel | Authentication Value |
| Security Question | In-Band | 3 |
| Password | In-Band | 5 |
| OTP | Email | 5 |
| TIV | Email | 7 |
| OTP | SMS | 10 |
| OTP | TOTP | 12 |
| TIV | SMS | 15 |
| TIV | Push to Designated Approval Channel (DAC) | 20 |
| Web Authentication | In-Band | 30 |

The challenge method selector component 930 selects one or more selected challenge methods 928, such as from Tables 1-3, to be performed by the challenge method orchestrator component 912 to meet the adjusted goal authentication level 904 for each of the assurance types 909. In some examples, a user interface is presented to the user information 934 of the account 935 to select an available challenge method 942 to be performed by the challenge method orchestrator component 912. The challenge method selector component 930 may access preferences 936 and challenges 938 of a user information 934 to determine which challenge method 942 to select. For example, if the user information 934 of the account 935 has selected SMS and performed the SMS challenge method 942 successfully a threshold number of times, then the challenge method selector component 930 may select SMS as the selected challenge method 928. The preferences 936 indicate preferences 936 of the user information 934 of the account 935 such as that SMS challenge method 942 is preferred over an email challenge method 942.

TABLE 3

| | |
|---|---|
| Identity Challenge Bank | |
| Challenge Method | Authentication Value |
| Enrolled, unverified Email | 1 |
| Enrolled, verified Email | 5 |
| Enrolled, verified Phone | 10 |

Additionally, the challenge method selector component 930 may use access authentication challenge information 940 of other users 1018 and determine the selected challenge method 928 based on availability, success rates, enjoyability, and so forth of the challenge method 942. For example, users 1018 may successfully perform the email challenge method 942 at a 90% rate and the SMS challenge method 942 at a 95% rate. The challenge method selector component 930 may then be more likely to select the SMS challenge method 942. Additionally, the challenge method selector component 930 may examine the time to complete challenge methods 942 and be more likely to select challenge methods 942 that require less time of the user information 934. The challenge method selector component 930 ensures that the communication challenge 952 is available to a user associated with the session ID 939.

The challenge method orchestrator component 912 performs the selected challenge method 928 selected by the challenge method selector component 930. The challenge method orchestrator component 912 may determine the challenge method 942 was solved 948 or not solved 948. The challenge method orchestrator component 912 may request an additional challenge method 942 from the challenge method selector component 930.

In another example, if the goal authentication level 908 is 5, and the risk component 918 determines there is no risk level 916 for an assurance type 909 of the ATO risk, then the adjusted goal authentication level 904 is the same as the goal authentication level 908. The challenge method selector component 930 selects the password challenge from Table 2 to achieve a 5+ authentication value added to the current authentication level 910 to meet the goal authentication level 908.

In another example, goal authentication level 908 is 5, and the risk component 918 determines that the risk level 916 for the assurance type 909 of authentication is high. The goal authentication level 908 is increased from 5 to 10 to generate the adjusted goal authentication level 904. The challenge method orchestration component 912 selects the OTP/SMS challenge and the password challenge from Table 2, the authentication challenge bank, to achieve a 15+ authentication value, which is need to raise the current authentication level 910 to the adjusted goal authentication level 904.

In another example, if the operation 958 is "log-in" and the goal authentication level 908 for assurance type 909 of identity is 1, and the risk component 918 determines the risk level 916 for the assurance type 909 of identity, which is associated with the risk type 960 of BAA, is low, then the adjusted goal authentication level 904 is the same as the goal authentication level 908. The challenge method orchestrator component 912 selects from Table 3 the challenge method 942 of "enrolled, unverified Email" to achieve an authentication value of 1, which is needed to reach the adjusted goal authentication level 904 for the assurance type 909 of identity.

In another example, if the operation 958 is "log-in" and the goal authentication level 908 for assurance type 909 of identity is 1, and the risk component 918 determines the risk level 916 for the assurance type 909 of identity, which is associated with the risk type 960 of BAA, is high, then the adjusted goal authentication level 904 is increased from 1 to 10 from the goal authentication level 908. The challenge method orchestrator component 912 selects from Table 3 the challenge method 942 of "OTP/SMS" to achieve an authentication value of 10+, which is needed to reach the adjusted goal authentication level 904 for the assurance type 909 of identity.

In another example, if a user associated with the session ID 939, has successfully completed the challenge method 942 of "password" from Table 2, then their current authentication level 910 is 5 for an assurance type 909 of authentication. In another example, if a user associated with the session ID 939 has completed the challenge method 942 of "password" from Table 2 and the challenge method 942 of "TIV/push" from Table 2 with an authentication value of 20, then the user's current authentication level 910 would be 25. The current authentication level 910 with assurance type 909 of authentication is associated with the session ID 939 and not the account 935, so it does not carry over to the next session, in accordance with some examples.

In another example, if a user associated with the session ID 939 and account 935, was just enrolled into the system but has an unverified email address, then the current authentication level 910 with an assurance type 909 of identity is 1. If the user verified their email address, then their current authentication level 910 for the assurance type 90 of identity would then be 5. If later the user also enrolled in a verified phone number, then their current authentication level 910 for the assurance type 909 of identity would be 15. If later the user lost their verified phone number, for example another user also used the same phone number, then the current authentication level 910 for the assurance type 909 of identity would be reduced to 5. The current authentication level 910 for the assurance type 909 of identity is associated with the account 935 and will carry over from session ID 939 to session ID 939. The current authentication level 910 for the assurance type 909 of identity is based on which communication channels 952 are currently verified for the account 935 (or user ID) and the verification status of the communication channels 952.

FIG. 10 illustrates a system 1000 for authentication challenge orchestration, in accordance with some examples. The challenge orchestration component 912, off-site client device 1004, server 1006, and user 1018 send communications 1012 to one another. The server 1006 stores information and includes one or more computer systems providing and/or processing the information. In some examples, the server 1006 is the interactive server system 110. The off-site client device 1004 is a computing or communication device that may participate in satisfying the challenge method 942 and/or may provide information such as risk information 1020, authentication challenge information 940, or user information 934. In some examples, the off-side client device 1004 is the computing device 114, computer client device 118, or another computing device. In some examples, the server 1006 provides the authentication able 318 and/or the authentication orchestration system 234.

The network 1002 is the internet, a cellular telephone network such as an LTE network, a 3GPP network, an IEEE 802.11 network, a BlueTooth® network, a proprietary network, or another type of network, or a combination of networks.

The challenge orchestration component 912 accesses information from the off-site client device 1004, the server 1006, and/or the user system 102, and performs the challenge method 942 with the user system 102 and/or the user 1018. The interactions 1014 includes the user 1018 providing information such as passwords, SMS codes, biological (bio) information, email codes, and so forth. The bio information 1016 includes information such as an image of a face of the user 1018 being capturing by the head-wearable apparatus 116, computing device 114, or computer client device 118, which are communication channels 952. The account 935 may be associated with applications that are running on the off-site client device 1004, the server 1006, and/or the user system 102. In some examples, the application 106 associated with the account 935 is an interaction application such as is hosted by the interaction servers 124 where the application 106 may be executed by both the interaction client 104 and interaction servers 124.

In some embodiments, a user interface may be used to indicate to the user 1018 that the user 1018 should move their eyes or head so that multiple images of the user 1018 may be captured as part of the challenge method 942.

FIG. 11 illustrates a method 1100 for authentication challenge orchestration, in accordance with some examples. The method 1100 begins at operation 1102 with receiving, from a client, an authentication request with a goal authentication value for a user. For example, referring to FIG. 9, authentication client 906 sends an authentication request 937 to the challenge orchestration component 902. In an example, the goal authentication level 908 is "15". In some examples, the goal authentication value is determined by the challenge orchestration component 902 as described herein and may be based on an assurance type 909.

The method 1100 continues at operation 1104 with determining a current authentication risk level. For example, the risk component 918 determines a risk level 916 based on authentication challenge information 940, user information 934, risk information 1020, and so forth. The current authentication risk level may be based on a assurance type 909. Continuing with the example, the risk level 916 is "normal".

The method 1100 continues at operation 1106 with determining a current authentication value. For example, the current authentication value may be included in the authentication request 937 with current authentication level 910. In some examples, the current authentication value may be determined based on authentication challenge information 940, user information 934, an assurance type 909, or other information accessible to the challenge orchestration component 902. Continuing with the example, the current authentication level 910 is "5".

The method 1100 continues at operation 1108 with determining whether the current authentication value is greater than or equal to the goal authentication value for one or more authentication values 944. For example, if the current authentication level 910 is greater than or equal to the goal authentication level 908, then the method 1100 continues at operation 1110 with the challenge orchestration component 902 returning a value for pass/fail 905 of "pass". In some examples, the goal authentication level 908 and/or the current authentication level 910 is adjusted in accordance with the risk level 916. In some examples, the determining is based on an adjusted goal authentication level 904, which is adjusted by the challenge orchestration component 902 based on the risk level 916.

Continuing the example above, the goal authentication level 908 for an assurance value 944 is "15" and the current authentication level 910 for an assurance type 909 is "5", so the method 1100 continues at operation 1112 with determining whether it is possible to reach the goal authentication value. For example, the assurance determination component 926 determines whether the adjusted goal authentication level 904 or the goal authentication level 908 is achievable 924. If the adjusted goal authentication level 904 or the goal authentication level 908 is not achievable 924 based on challenge methods 942 that are available 950 to be performed by the challenge method orchestration component 912, then the method 1100 continues at operation 1114 with returning "fail". For example, the challenge orchestration component 902 returns pass/fail 905 with a value of "fail" to the authentication client 906 in response to the authentication request 937.

Alternatively, if the adjusted goal authentication level 904 or the goal authentication level 908 is achievable 924 based on challenge methods 942 that are available 950 to be performed by the challenge method orchestration component 912, then the method 1100 continues at operation 1116 with selecting a challenge method. For example, the challenge method selector component 930 selects a selected challenge method 928 from the challenge method 942 based on the authentication challenge information 940, the user information 934, and other information available to the challenge method selector component 930. Continuing with the example, the selected challenge method 928 is, from Table 1, "SMS" with an "authentication value" of "10".

The method 1100 continues at operation 1118 with performing the challenge method. For example, the challenge method orchestrator component 912 performs the selected challenge method 928 with the user 1018, or another entity, of the account 935. Continuing with the example above, the challenge method orchestrator component 912 access a telephone number based on user information 934 associated with the account 935. The challenge method orchestrator component 912 then sends an "SMS" message with a code to the computing device 114 of the user 1018. The user 1018 enters the code in the computing device 114. The challenge method orchestrator component 912 determines that the challenge method 942 was solved 948 if the code sent in the "SMS" message matches the code entered by the user 1018.

The method 1100 continues at operation 1120 with determining whether the challenge method 942 was solved 948. Continuing the example above, the challenge method orchestrator component 912 determines that the challenge method 942 was solved 948 if the code sent in the "SMS" message matches the code entered by the user 1018. If the challenge method 942 was successfully solved 948, then the method 1100 continues at operation 1122 with returning pass. For example, challenge orchestration component 902 return a value of pass/fail 905 of "pass". If the challenge method 942 was not successfully solved 948, then the method 1100 returns to operation 1112.

The method 1100 may optionally include one or more additional operations. The operations of method 1100 may be performed in a different order. One or more of the operations of method 1100 may be optional. The method 1100 may be performed in whole or in part by an apparatus or apparatuses of the computing devices disclosed herein in connection with FIGS. 1-12.

FIG. 12 illustrates a method 1200 for authentication challenge orchestration, in accordance with some examples. The method 1200 begins at operation 1202 with receiving, from an authentication client, an authentication request, the authentication request comprising an indication of an account and an indication of a goal authentication level. For example, referring to FIG. 9, authentication client 906 sends an authentication request 937 to the challenge orchestration component 902.

The method 1200 continues at operation 1204 with accessing a current authentication level. For example, the current authentication value may be included in the authentication request 937 with current authentication level 910. In some examples, the current authentication value may be determined based on authentication challenge information 940, user information 934, or other information accessible to the challenge orchestration component 902.

The method 1200 continues at operation 1206 with adjusting, based on a risk level, the goal authentication level to an adjusted goal authentication level. For example, the risk component 918 determines a risk level 916. The challenge orchestration component 902 then uses the risk level 916 to adjust the goal authentication level 908 to determine an adjusted goal authentication level 904.

The method 1200 continues at operation 1208 with selecting a challenge method based on a difference between the adjusted goal authentication level and the current authentication level. For example, the challenge method selector component 930 selects a challenge method 942 based on authentication values 944, solved 948, available 950, and user information 934.

The method 1200 continues at operation 1210 with performing the selected challenge method with a user associated with the account. For example, the challenge method orchestrator component 912 performs the selected challenge method 928.

The method 1200 continues at operation 1212 with causing to be sent, to the authentication client, an indication of whether the adjusted authentication level was achieved. For example, the challenge orchestration component 902 sends a value for pass/fail 905 to the authentication client 906.

The method 1200 may optionally include one or more additional operations. The operations of method 1200 may be performed in a different order. One or more of the operations of method 1200 may be optional. The method 1200 may be performed in whole or in part by an apparatus or apparatuses of the computing devices disclosed herein in connection with FIGS. 1-12.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" or "module" refers, for example, to a device, physical entity, or logic having boundaries defined by function or subroutine calls, branch points, APIs, or other technologies that provide for the partitioning or modularization of particular processing or control functions. Components or modules may be combined via their interfaces with other components to carry out a machine process. A component or module may be a packaged functional hardware unit designed for use with other components and a part of a program that usually performs a particular function of related functions. Components or modules may constitute either software components (e.g., code embodied on a machine-readable medium) or hardware components. A "hardware component" or "hardware module" is a tangible unit capable of performing certain operations and may be configured or arranged in a certain physical manner. In various examples, one or more computer systems (e.g., a standalone computer system, a client computer system, or a server computer system) or one or more hardware components or software components of a computer system (e.g., a processor or a group of processors) may be configured by software (e.g., an application or application portion) as a hardware component or software component that operates to perform certain operations as described herein. A hardware component or hardware module may also be implemented mechanically, electronically, or any suitable combination thereof. For example, a hardware component hardware module may include dedicated circuitry or logic that is permanently configured to perform certain operations. A hardware component or hardware module may be a special-purpose processor, such as a field-programmable gate array (FPGA) or an application-specific integrated circuit (ASIC). A hardware component or hardware module may also include programmable logic or circuitry that is temporarily configured by software to perform certain operations. For example, a hardware component or hardware module may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component or hardware module mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components or hardware modules can provide information to, and receive information from, other hardware components. Accordingly, the described hardware components or hardware modules may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component or hardware module may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. Additional claimable subject matter further includes the following:

Example 1 is an apparatus of a computing device comprising: one or more processors; and a memory storing instructions that, when executed by the one or more processors, configure the one or more processors to perform operations comprising: receiving, from an authentication client, an authentication request, the authentication request comprising an indication of an account and an indication of a goal authentication level; accessing a current authentication level; adjusting, based on a risk level, the goal authentication level to an adjusted goal authentication level; selecting a challenge method of a plurality of challenge methods based on a difference between the adjusted goal authentication level and the current authentication level; performing the selected challenge method with a user associated with the account; and causing to be sent, to the authentication client, an indication of whether the adjusted authentication level was achieved.

In Example 2, the subject matter of Example 1 includes, wherein the selected challenge method is associated with an authentication value, and wherein the operations further comprise: causing to be sent an indication of the authentication value.

In Example 3, the subject matter of Examples 1-2 includes, wherein the operations further comprise: determining the risk level based on a number of authentication requests received from the authentication client for the account.

In Example 4, the subject matter of Example 3 includes, wherein the risk level is determined based further on previous changes to the account.

In Example 5, the subject matter of Examples 1-4 includes, wherein the operations further comprise: determining the risk level based on risk information regarding other accounts.

In Example 6, the subject matter of Examples 1-5 includes, wherein the authentication request further comprises the current authentication level.

In Example 7, the subject matter of Examples 1-6 includes, wherein the operations further comprise: in response to the user associated with the account failing the challenge method, selecting another challenge method, and performing the another challenge method.

In Example 8, the subject matter of Examples 1-7 includes, wherein the operations further comprise: causing to be displayed on a display associated with the user of the account, a list of available challenge methods, and wherein the selecting is further based on a received selection of the list of available challenge methods.

In Example 9, the subject matter of Examples 1-8 includes, wherein the operations further comprise: accessing information associated with the user, the information indicating computing devices associated with the user, and wherein the selecting is further based on the computing devices associated with the user.

In Example 10, the subject matter of Examples 1-9 includes, wherein the operations further comprise: determining whether the adjusted goal authentication level can be achieved; and in response to determining the adjusted goal authentication level cannot be achieved, sending an indication that the adjusted goal authentication level cannot be achieved to the authentication client.

In Example 11, the subject matter of Examples 1-10 includes, wherein the plurality of challenge methods comprises one or more of: sending a code using a short message service, querying the user for a shared secret, calling a telephone number associated with the account, sending a code in an email associated with the account, and capturing biometric data of the user.

In Example 12, the subject matter of Examples 1-11 includes, wherein the computing device is a first computing device, and wherein the receiving further comprises: receiving, from the authentication client on a second computing device, the authentication request, the authentication request comprising the indication of the account and the indication of the goal authentication level.

In Example 13, the subject matter of Examples 1-12 includes, wherein the authentication request comprises a session identification, and wherein the operations further comprise: generating a transaction identification; and associating the transaction identification with the session identification and the authentication request.

Example 14 is a non-transitory computer-readable storage medium including instructions that, when processed by one or more processors, configure the one or more processors to perform operations comprising: receiving, from an authentication client, an authentication request, the authentication request comprising an indication of an account and an indication of a goal authentication level; accessing a current authentication level; adjusting, based on a risk level, the goal authentication level to an adjusted goal authentication level; selecting a challenge method of a plurality of challenge methods based on a difference between the adjusted goal authentication level and the current authentication level; performing the selected challenge method with a user associated with the account; and causing to be sent, to the authentication client, an indication of whether the adjusted authentication level was achieved.

In Example 15, the subject matter of Example 14 includes, wherein the selected challenge method is associated with an authentication value, and wherein the operations further comprise: causing to be sent an indication of the authentication value.

In Example 16, the subject matter of Examples 14-15 includes, wherein the operations further comprise: determining the risk level based on a number of authentication requests received from the authentication client for the account.

In Example 17, the subject matter of Example 16 includes, wherein the risk level is determined based further on previous changes to the account.

Example 18 is a method comprising: receiving, by one or more processors, from an authentication client, an authentication request, the authentication request comprising an indication of an account and an indication of a goal authentication level; accessing a current authentication level; adjusting, based on a risk level, the goal authentication level to an adjusted goal authentication level; selecting a challenge method of a plurality of challenge methods based on a difference between the adjusted goal authentication level and the current authentication level; performing the selected challenge method with a user associated with the account; and causing to be sent, to the authentication client, an indication of whether the adjusted authentication level was achieved.

In Example 19, the subject matter of Example 18 includes, wherein the selected challenge method is associated with an authentication value, and wherein the method further comprises: causing to be sent an indication of the authentication value.

In Example 20, the subject matter of Examples 18-19 includes, wherein the method further comprises: determining the risk level based on a number of authentication requests received from the authentication client for the account.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. An apparatus of a computing device comprising:
one or more processors; and
a memory storing instructions that, when executed by the one or more processors, configure the one or more processors to perform operations comprising:
receiving, from an authentication client over a computer network, an authentication request, the authentication request comprising an indication of an account associated with a user and an indication of a goal authentication level for an assurance type;
accessing a current authentication level for the assurance type;

adjusting, based on a risk level, the goal authentication level to an adjusted goal authentication level;
selecting a challenge method of a plurality of challenge methods based on a difference between the adjusted goal authentication level for the assurance type and the current authentication level for the assurance type, the selected challenge method having different values for different assurance types, wherein the different assurance types comprise at least a certainty that a run-time environment the user is using has not been tampered with or a level of certainty that the user is not an automated application;
performing, over a computer network, the selected challenge method with the user associated with the account; and
causing to be sent, to the authentication client, an indication of whether the adjusted authentication level was achieved.

2. The apparatus of claim 1, wherein the selected challenge method is associated with an authentication value, and wherein the operations further comprise:
causing to be sent an indication of the authentication value.

3. The apparatus of claim 1, wherein the operations further comprise:
determining the risk level based on a number of authentication requests received from the authentication client for the account.

4. The apparatus of claim 3, wherein the risk level is determined based further on previous changes to the account.

5. The apparatus of claim 1, wherein the operations further comprise:
determining the risk level based on risk information regarding other accounts.

6. The apparatus of claim 1, wherein the authentication request further comprises the current authentication level.

7. The apparatus of claim 1, wherein the operations further comprise:
in response to the user associated with the account failing the selected challenge method, selecting another challenge method, and performing the another challenge method.

8. The apparatus of claim 1, wherein the operations further comprise:
causing to be displayed on a display associated with the user of the account, a list of available challenge methods, and wherein the selecting is further based on a received selection of the list of available challenge methods.

9. The apparatus of claim 1, wherein the operations further comprise:
accessing information associated with the user, the information indicating computing devices associated with the user, and wherein the selecting is further based on the computing devices associated with the user.

10. The apparatus of claim 1, wherein the operations further comprise:
determining whether the adjusted goal authentication level can be achieved; and
in response to determining the adjusted goal authentication level cannot be achieved, sending an indication that the adjusted goal authentication level cannot be achieved to the authentication client.

11. The apparatus of claim 1, wherein the plurality of challenge methods comprises one or more of: sending a code using a short message service, querying the user for a shared secret, calling a telephone number associated with the account, sending a code in an email associated with the account, and capturing biometric data of the user.

12. The apparatus of claim 1, wherein the computing device is a first computing device, and wherein the receiving further comprises:

receiving, from the authentication client on a second computing device, the authentication request, the authentication request comprising the indication of the account and the indication of the goal authentication level.

13. The apparatus of claim 1, wherein the authentication request comprises a session identification, and wherein the operations further comprise:

generating a transaction identification; and associating the transaction identification with the session identification and the authentication request.

14. The apparatus of claim 1, wherein the selecting is based on a convenience to the user.

15. The apparatus of claim 1, wherein the operations further comprise:

determining, based at least on a user device of the user, a plurality of challenge methods available to the user.

16. The apparatus of claim 1, wherein the goal authentication level, the current authentication level, and the different values for different assurance types are integer values.

17. A non-transitory computer-readable storage medium including instructions that, when processed by one or more processors, configure the one or more processors to perform operations comprising:

receiving, from an authentication client over a computer network, an authentication request, the authentication request comprising an indication of an account associated with a user and an indication of a goal authentication level for an assurance type;

accessing a current authentication level for the assurance type;

adjusting, based on a risk level, the goal authentication level to an adjusted goal authentication level;

selecting a challenge method of a plurality of challenge methods based on a difference between the adjusted goal authentication level for the assurance type and the current authentication level for the assurance type, the selected challenge method having different values for different assurance types, wherein the different assurance types comprise at least a certainty that a run-time environment the user is using has not been tampered with or a level of certainty that the user is not an automated application;

performing, over a computer network, the selected challenge method with the user associated with the account; and causing to be sent, to the authentication client, an indication of whether the adjusted authentication level was achieved.

18. The non-transitory computer-readable storage medium of claim 17, wherein the selected challenge method is associated with an authentication value, and wherein the operations further comprise:

causing to be sent an indication of the authentication value.

19. The non-transitory computer-readable storage medium of claim 17, wherein the operations further comprise:

determining the risk level based on a number of authentication requests received from the authentication client for the account.

20. A method performed on an apparatus of a computing device, the method comprising:

receiving, from an authentication client over a computer network, an authentication request, the authentication request comprising an indication of an account associated with a user and an indication of a goal authentication level for an assurance type;

accessing a current authentication level for the assurance type;

adjusting, based on a risk level, the goal authentication level to an adjusted goal authentication level;

selecting a challenge method of a plurality of challenge methods based on a difference between the adjusted goal authentication level for the assurance type and the current authentication level for the assurance type, the selected challenge method having different values for different assurance types, wherein the different assurance types comprise at least a certainty that a run-time environment the user is using has not been tampered with or a level of certainty that the user is not an automated application;

performing, over a computer network, the selected challenge method with the user associated with the account; and causing to be sent, to the authentication client, an indication of whether the adjusted authentication level was achieved.

* * * * *